(12) United States Patent
Punathil

(10) Patent No.: US 11,900,078 B2
(45) Date of Patent: Feb. 13, 2024

(54) TUNING A CONTAINER ORCHESTRATOR

(71) Applicant: INTERNATIONAL BUSINESS MACHINES CORPORATION, Armonk, NY (US)

(72) Inventor: Gireesh Punathil, Kannur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 175 days.

(21) Appl. No.: 17/502,281

(22) Filed: Oct. 15, 2021

(65) Prior Publication Data
US 2023/0118271 A1 Apr. 20, 2023

(51) Int. Cl.
*G06F 9/44* (2018.01)
*G06F 8/30* (2018.01)
*G06N 5/02* (2023.01)

(52) U.S. Cl.
CPC .............. *G06F 8/311* (2013.01); *G06N 5/02* (2013.01)

(58) Field of Classification Search
CPC ................................. G06F 8/311; G06N 5/02
USPC .................................................. 717/120–123
See application file for complete search history.

(56) References Cited

U.S. PATENT DOCUMENTS

| | | | |
|---|---|---|---|
| 8,806,015 B2 | 8/2014 | Dutta et al. | |
| 10,104,053 B2 * | 10/2018 | Wipfel | H04L 63/0815 |
| 10,686,682 B2 | 6/2020 | Navare et al. | |
| 11,321,130 B2 * | 5/2022 | Hallur | G06F 21/53 |
| 11,321,141 B2 * | 5/2022 | Rafey | G06N 20/00 |
| 11,593,180 B2 * | 2/2023 | Gupta | G06F 9/5044 |
| 2020/0117447 A1 | 4/2020 | Catalano et al. | |
| 2022/0382593 A1 * | 12/2022 | Tootaghaj | G06F 9/45558 |

FOREIGN PATENT DOCUMENTS

| | | |
|---|---|---|
| EP | 2883140 A1 | 6/2015 |
| WO | 2014/025584 A1 | 2/2014 |

OTHER PUBLICATIONS

Zheng et al., "Autoscaling High-Throughput Workloads on Container Orchestrators", 2020, IEEE, pp. 142-152. (Year: 2020).*
Wira D. Mulia et. al, "Cloud Workload Characterization", ResearchGate, Jan. 2020, 25 pages.
Tatsuhiro Chiba et. al, "ConfAdvisor: A Performance-centric Configuration Tuning Framework for Containers on Kubernetes", IBM Research, 2019, 11 pages.
(Continued)

*Primary Examiner* — Ted T. Vo
(74) *Attorney, Agent, or Firm* — Monchai Chuaychoo; Andrew D. Wright; Calderon Safran & Cole, P.C.

(57) ABSTRACT

A method includes determining, by a computing device, a programming language of a running workload; selecting, by the computing device, a profiler module in view of the programming language; determining, by the computing device, characteristics of the running workload using the profiler module; identifying, by the computing device, a persona of the running workload from the characteristics; identifying, by the computing device, orchestration policies which map to the persona; tuning, by the computing device, a container orchestrator module in view of the orchestration policies; and deploying, by the computing device, containers to the running workload using the tuned container orchestrator module.

20 Claims, 6 Drawing Sheets

(56) References Cited

OTHER PUBLICATIONS

Kenga Mosoti Derdus et. al, "Statistical Techniques for Characterizing Cloud Workloads: A Survey", published in International Journal of Computer and Information Technology, Jan. 2019, 6 pages.

Piotr Orzechowski et. al, "Categorization of Cloud Workload Types with Clustering", Proceedings of the International Conference on Signal, Networks, Computing, and Systems, Oct. 2016, 6 pages.

Opsani Team,"Optimizing Kubernetes Cluster Workloads with Opsani Vital", https://opsani.com/blog/optimizing-kubernetes-cluster-opsani-vital/, Jun. 3, 2020, 2 pages.

Unknown, "Amazon Elasticsearch Service announces Auto-Tune feature for improved performance and application availability", https://aws.amazon.com/about-aws/whats-new/2021/03/amazon-elasticsearch-service-announces-auto-tune-feature-improved-performance-application-availability/, Mar. 24, 2021, 2 pages.

Jungsu Han et. a, "Refining Microservices Placement Employing Workload Profiling Over Multiple Kubernetes Clusters", https://ieeexplore.ieee.org/stamp/stamp.jsp?arnumber=9235316, Oct. 22, 2020, 14 pages.

Mell et al., "The NIST Definition of Cloud Computing", NIST, Special Publication 800-145, Sep. 2011, 7 pages.

\* cited by examiner

| Workload Persona / Key Indicator | Performance | Reliability | Security |
|---|---|---|---|
| edge | CP1 + NP1 | IP1 + MP1 | SP1 |
| analytic | CP2 + NP2 | IP1 + MP1 | SP1 |
| streaming | CP3 + NP1 | IP2 + MP2 | SP1 |
| finance | CP4 + NP2 | IP3 + MP3 | SP2 |
| federal | CP1 + NP3 | IP4 + MP4 | SP3 |

FIG. 5

TUNING A CONTAINER ORCHESTRATOR

BACKGROUND

Aspects of the present invention relate generally to software containers and, more particularly, to tuning a container orchestrator.

A container is a stand-alone executable package of a piece of software that includes everything for running the software, including application code, runtime, system tools, system libraries, and settings. Containers are lightweight and include layers of filesystems, e.g., sharing common files, making disk usage and image downloads efficient. Containers run in various environments, including but not limited to a local computing device (e.g., a desktop or a laptop), physical or virtual machines in a data center, and cloud providers.

SUMMARY

In a first aspect of the invention, there is a computer-implemented method including: determining, by a computing device, a programming language of a running workload; selecting, by the computing device, a profiler module in view of the programming language; determining, by the computing device, characteristics of the running workload using the profiler module; identifying, by the computing device, a persona of the running workload from the characteristics; identifying, by the computing device, orchestration policies which map to the persona; tuning, by the computing device, a container orchestrator module in view of the orchestration policies; and deploying, by the computing device, containers to the running workload using the tuned container orchestrator module.

In another aspect of the invention, there is a computer program product including one or more computer readable storage media having program instructions collectively stored on the one or more computer readable storage media. The program instructions are executable to: determine a workload is running; determine a programming language of the workload; select a profiler module in view of the programming language; determine characteristics of the workload using the profiler module; identify a persona of the workload from the characteristics; identify orchestration policies which map to the persona; and tune a container orchestrator module in view of the orchestration policies.

In another aspect of the invention, there is system including a processor, a computer readable memory, one or more computer readable storage media, and program instructions collectively stored on the one or more computer readable storage media. The program instructions are executable to: determine a container orchestrator module is performing actions to run a workload; determine a programming language of the workload; select a profiler module in view of the programming language; determine characteristics of the workload using the profiler module; identify a persona of the workload from the characteristics; identify orchestration policies which map to the persona; tune the container orchestrator module in view of the orchestration policies; and deploy containers to the workload using the tuned container orchestrator module.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 5 shows a policy matrix in accordance with aspects of the invention.

DETAILED DESCRIPTION

Figure 1:
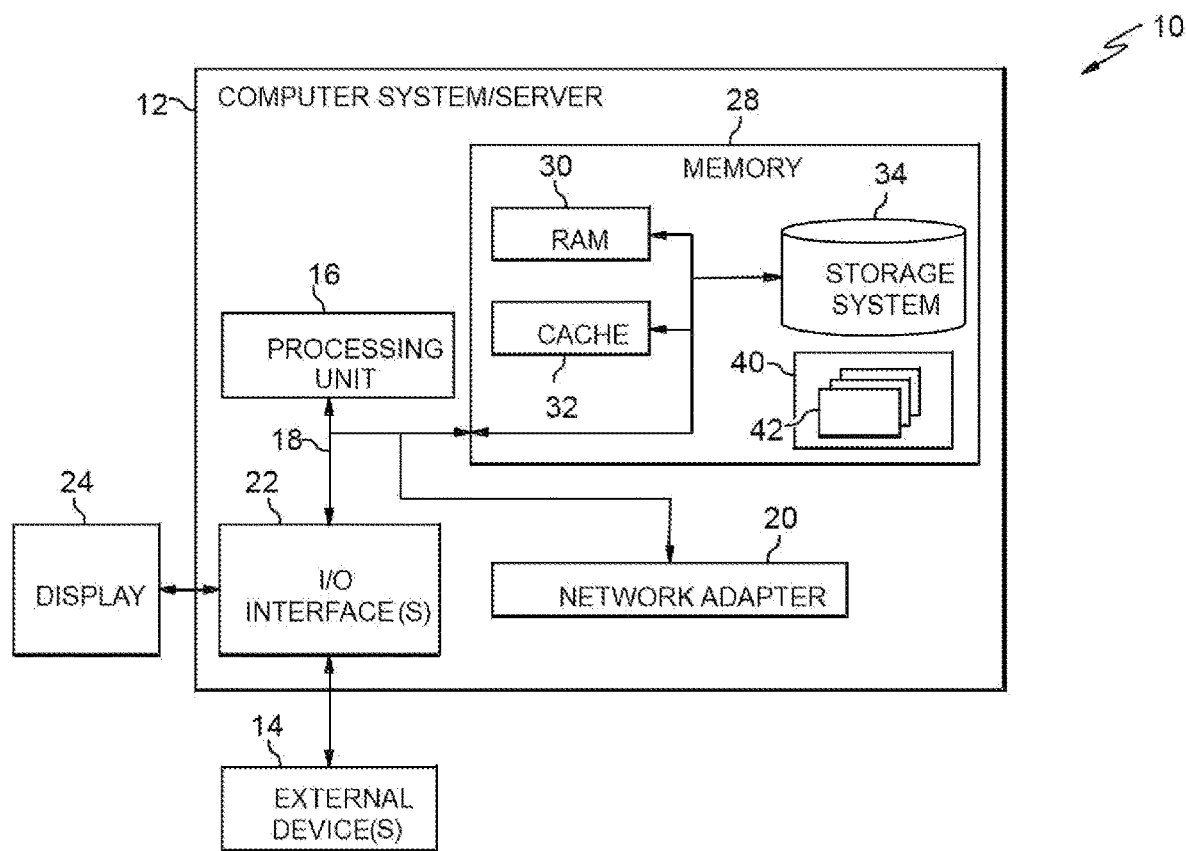
FIG. 1 depicts a cloud computing node according to an embodiment of the present invention.

Aspects of the present invention relate generally to software containers and, more particularly, to tuning a container orchestrator. According to aspects of the invention, systems and methods identify a persona of a running workload and tune a container orchestrator in view of the workload persona. In embodiments, the systems and methods tune the container orchestrator in view of the workload persona by mapping the workload persona to specific orchestration policies against various performance indicators. In this manner, implementations of the invention optimize a container orchestrator by identifying a persona of a running workload and selecting appropriate orchestration policies of the container orchestrator in view of the mapping between the orchestration policies and the workload persona.

Implementations of the invention provide improvements to computer technologies by optimizing computing resources. In embodiments, aspects of the invention identify a persona of a running workload for a container orchestrator in view of either a user input or through analytics. In embodiments, in response to determining an identity of the persona, the systems and processes map orchestration policies to personas against various indicators, e.g., performance, reliability, and security. In embodiments, each orchestration policy of the orchestration policies represents values for one or more tunable parameters within the container orchestrator. In response to the mapping, implementations of the invention optimize a container orchestrator by selecting the orchestration policies for the container orchestrator in view of the mapping between the orchestration policies and the workload persona. In this way, aspects of the invention improve computer technologies by optimizing a container orchestrator. Implementations of the invention also allow for the practical application of optimizing a container orchestrator. In embodiments, aspects of the invention identify a persona of a running workload. In embodiments, identifying the persona occurs by either user input or by analytics. In embodiments, the systems and processes map various orchestration policies to the persona in view of various indicators, e.g., performance, reliability, and security, to generate a policy matrix. In embodiments, each orchestration policy represents values for one or more tunable parameters of the container orchestrator. In embodiments, implementations of the invention optimize a container orchestrator by identifying and applying orchestration policies which map to that persona to tune the container orchestrator. In this way, aspects of the invention improve computer technologies by tuning a container orchestrator to perform optimally.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
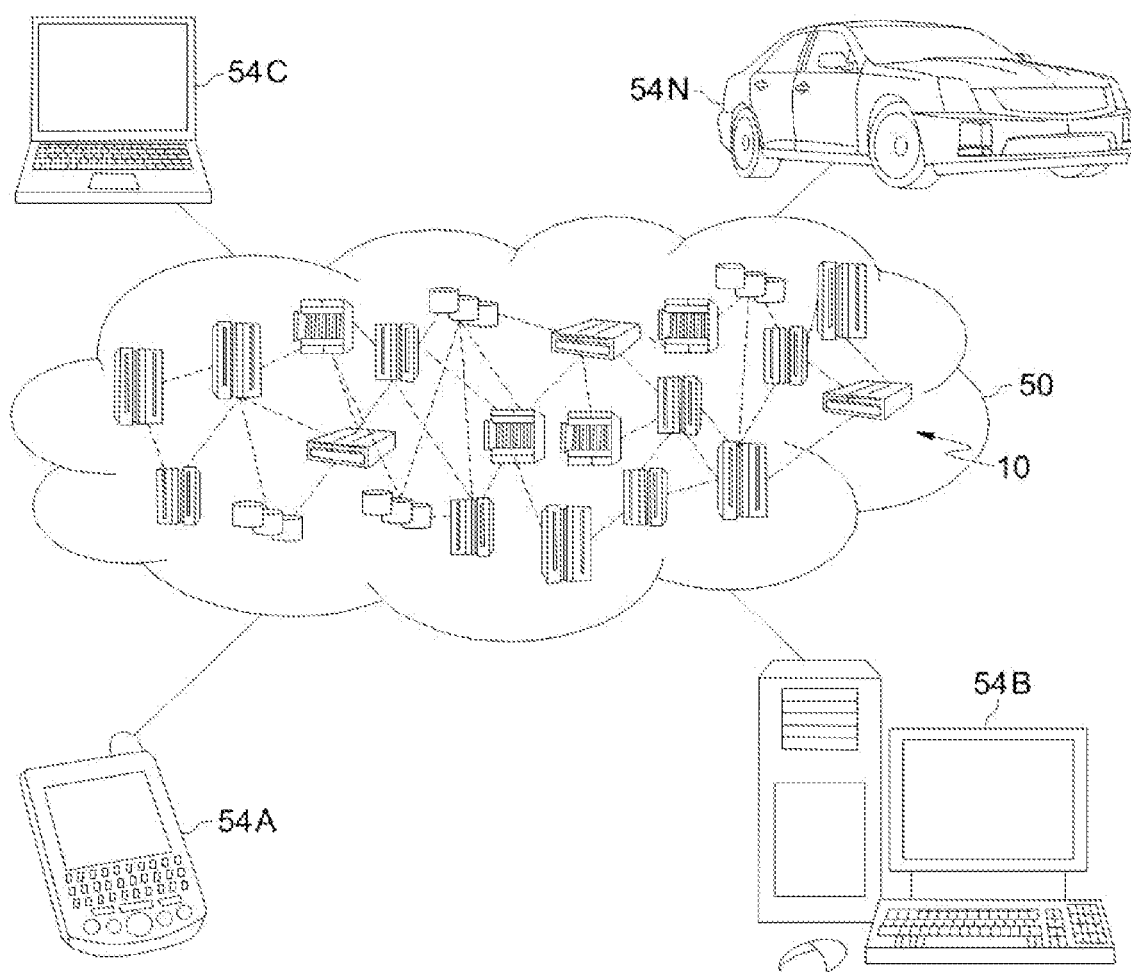
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
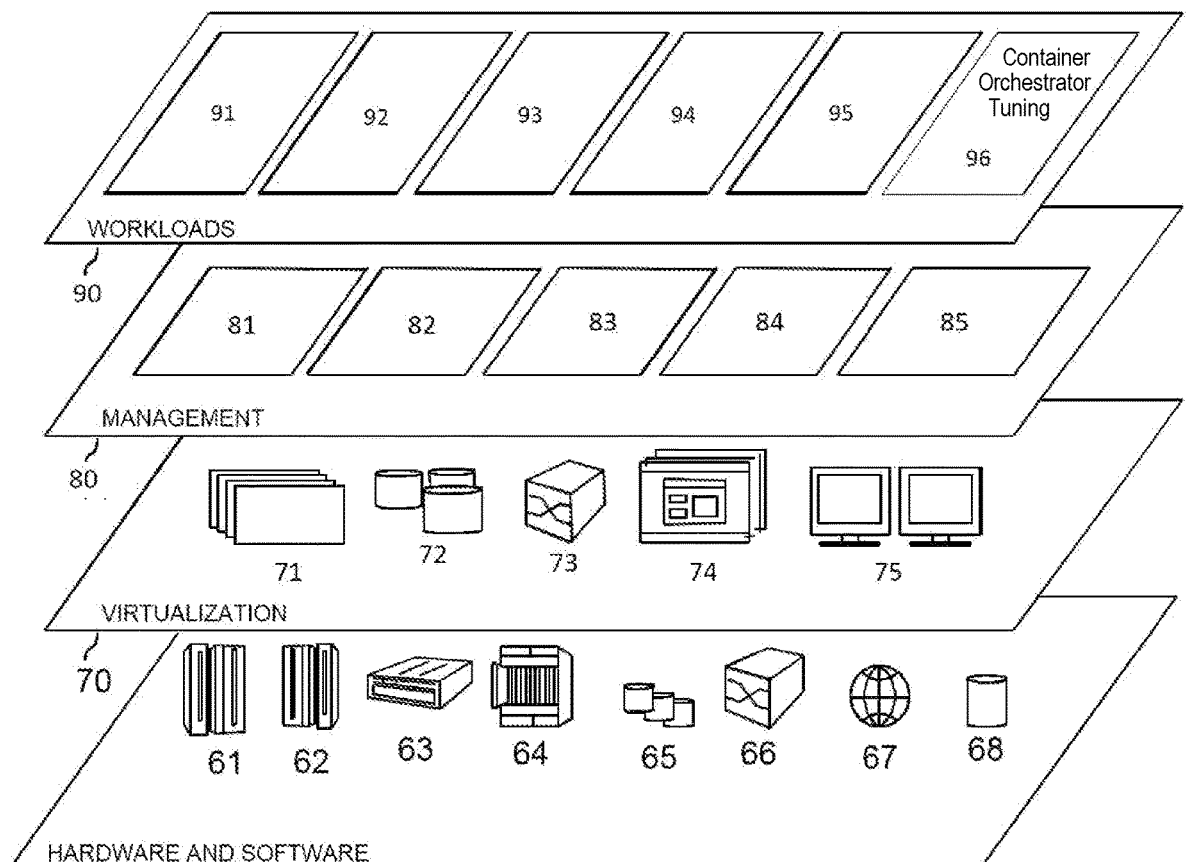
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container orchestrator tuning 96.

Implementations of the invention may include a computer system/server 12 of FIG. 1 in which one or more of the program modules 42 are configured to perform (or cause the computer system/server 12 to perform) one or more functions of the container orchestrator tuning 96 of FIG. 3. For example, the one or more of the program modules 42 may be configured to a) determine a programming language of a running workload; b) select a profiler module in view of the programming language; c) determine characteristics of the running workload using the profiler module; d) identify a persona of the running workload from the characteristics; e) identify orchestration policies which map to the persona; and f) tune a container orchestrator module in view of the orchestration policies.

Figure 4:
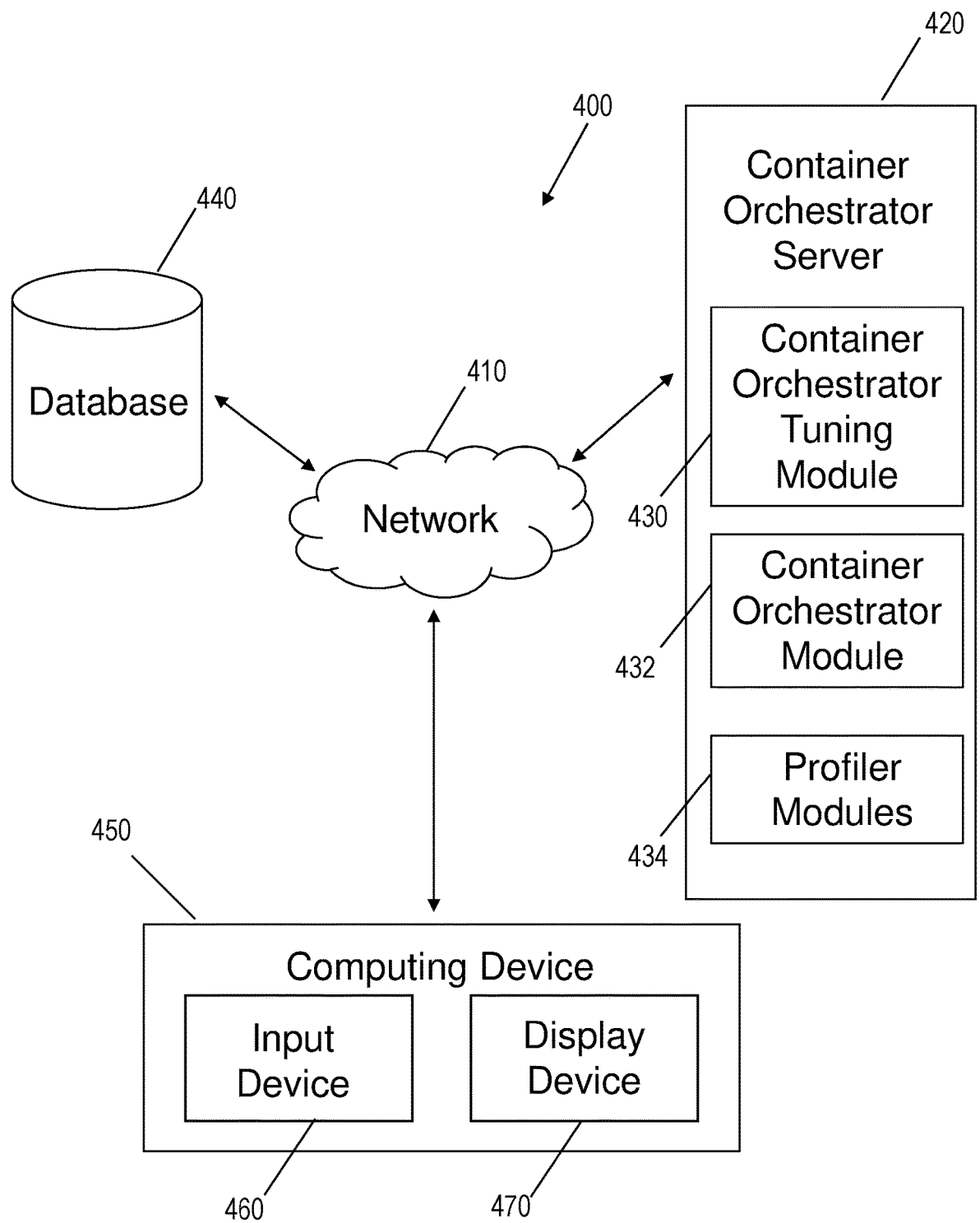
FIG. 4 shows a block diagram of an exemplary environment in accordance with aspects of the invention.

FIG. 4 shows a block diagram of an exemplary environment in accordance with aspects of the invention. In embodiments, the environment 400 includes a network 410, a container orchestrator server 420, a database 440, and a computing device 450 that includes an input device 460 and a display device 470 for viewing information. In embodiments, the computing device 450 is a user device, e.g., a desktop computer, a laptop computer, a tablet, a smartphone, amongst other examples, comprising one or more components of computer system/server 12 of FIG. 1. In further embodiments, the input device 460 includes a keyboard, mouse, camera, and/or a microphone, amongst other input devices. The container orchestrator server 420 is a computing device comprising one or more components of computer system/server 12 of FIG. 1.

In embodiments, the container orchestrator server 420 comprises a container orchestrator tuning module 430, which comprises one or more program modules such as program modules 42 described with respect to FIG. 1. Additionally, the container orchestrator server 420 includes a container orchestrator module 432, which comprises one or more program modules of the program modules 42 described with respect to FIG. 1. Further, the container orchestrator server 420 includes profiler modules 434, which comprise one or more program modules of the program modules 42 described with respect to FIG. 1. In embodiments, the container orchestrator tuning module 430 uses the profiler modules 434 to determine characteristics of a running workload, and then uses these characteristics to identify a persona of the running workload. In embodiments, the container orchestrator tuning module 430 then tunes the container orchestrator module 432 in view of orchestration policies which map to the persona.

The container orchestrator server 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the network 410 is any suitable network including any combination of one or more of a LAN, WAN, or the Internet. In a particular embodiment, the network 410 is representative of a cloud computing environment 50 as described in FIG. 2.

In embodiments, a workload includes a running of an application using a cluster of nodes, i.e., computing devices, with each computing device hosting a container. In embodiments, each container hosts a microservice which runs a specific function of the application. Examples of a workload include an edge workload, an analytic workload, a streaming workload, a finance workload, and a federal workload, amongst other types of workloads. An example of an edge workload includes a mobile computing device running a word processing application. In this edge workload example, each node hosts a container, and each container hosts a microservice for running a specific function of the word processing application. An example of an analytic workload is the running of an application which compares data from different sources. An example of a streaming workload includes the running of a streaming application for streaming media on a computing device. An example of a federal workload includes the running of a streaming application for encrypting data.

In embodiments, the container orchestrator module 432 automates a scheduling, a deployment, a networking, a scaling, a health monitoring, and a management of containers for applications. In embodiments, the container orchestrator module 432 selects which nodes are available to host the containers to run the workload. Additionally, the container orchestrator module 432 performs various functions after selecting the nodes for the workload to run. Examples of these functions include an automatic provisioning of the containers to the nodes, deployment of resources to the nodes, networking between the nodes, scaling of the containers, and life cycle management of the containers, amongst other functions to run the workload. In embodiments, orchestration policies represent attributes and behaviors of the container orchestrator module 432. For example, one orchestration policy includes using a specific transmission control protocol (TCP) policy for communications within a network, e.g., network 410, during the networking function of the container orchestrator module 432. As another example, one orchestration policy includes waiting for a specific amount of time for booting a container during a scaling function of the container orchestrator module 432.

In embodiments, tuning the container orchestrator module 432 improves a performance of a workload. As an example, tuning the container orchestrator module 432 allows for a relatively faster deployment of containers to run the workload. Additionally, tuning the container orchestrator module 432 allows for a relatively larging scaling of containers, which allows for relatively more containers to be available for deployment. By deploying containers relatively faster and/or scaling more containers for deployment, the performance of the workload improves because of an increase of computing resources available to the workload to utilize.

In embodiments, the container orchestrator module 432 includes default orchestration policies for performing these functions, with these default orchestration policies set in view of common workloads. However, workloads are diverse, and therefore the container orchestrator module 432 may need different orchestration policies in view of different workloads for the container orchestrator module 432 to run optimally. As an example, a workload for running a word processing application has different resource requirements in comparison to a workload for running a streaming application. As a further example, the streaming application requires relatively more memory than the word processing application. In this example, the container orchestrator module 432 may need different policies to allocate relatively more memory resources to the streaming application than the word processing application. While it is possible to individually tune each of the orchestration policies of the container orchestrator module 432 in view of the running workload, issues may arise from this individual tunning. For example, one issue which arises is a sub-optimal tuning of the orchestration policies of the container orchestrator module 432, thereby causing the container orchestrator module 432 to perform sub-optimally. Side effects of the container orchestrator module 432 performing sub-optimally include a waste of resources and additional costs, amongst other side effects. Another issue which arises from individual tuning of the orchestration policies is that the individual tuning of orchestration policies incurs a relatively substantial amount of effort.

In embodiments, the container orchestrator tuning module 430 begins determining a programming language of a running workload by determining a workload is running. In embodiments, the container orchestrator tuning module 430 determines the workload is running by determining the container orchestrator module 432 of the container orchestrator server 420 is performing actions. As an example, the container orchestrator tuning module 430 determines that the container orchestrator module 432 is performing an action of deploying containers for the workload to run in response to a deployment of containers from a registry of the containers. In this way, the container orchestrator tuning module 430 determines the workload is running by determining the container orchestrator module 432 is performing actions to run a workload.

In embodiments, in response to determining that there is a running workload, the container orchestrator tuning module 430 then profiles the running workload by determining a programming language of a running workload. In embodiments, the container orchestrator tuning module 430 determines the programming language in view of actions of the container orchestrator module 432. In embodiments, the actions include the container orchestrator module 432 deploying containers to run the workload. As an example, the container orchestrator module 432 deploys a plurality of containers which host a microservice using the same programming language. Examples of programming languages include java, node.js, and python, amongst other examples. As a further example, the container orchestrator tuning module 430 determines that the container orchestrator module 432 is deploying a plurality of containers which host microservices running a java language. In this way, the container orchestrator tuning module 430 determines a programming language of a running workload.

In embodiments, in response to determining the programming language of a running workload, the container orchestrator tuning module 430 selects a profiler module of the profiler modules 434 to profile the running workload. In embodiments, the profiler modules 434 determine characteristics of a running workload. In embodiments, each profiler module of the profile modules 434 matches a specific programming language. For example, in response to the container orchestrator tuning module 430 determining a running workload using a java programming language, the container orchestrator tuning module 430 selects a profiler module specific to the java programming language. In embodiments, in response to the container orchestrator server 420 not having a profiler module which matches the programming language, an administrator of the container orchestrator server 420 downloads and installs the profiler module into the profiler modules 434 of the container orchestrator server 420.

In embodiments, in response to selecting the profiler module, the container orchestrator tuning module 430 profiles the running workload to determine characteristics of the running workload. In this way, the profiler module is a runtime-operator since profiling occurs as the workload is running. In embodiments, profiling of the running workload includes the container orchestrator tuning module 430 recording various characteristics of the running workload by using the profiler module of the profiler modules 434. Categories of characteristics include network characteristics, computational characteristics, memory characteristics, security characteristics, and traffic characteristics, amongst other categories of characteristics. Examples of network characteristics include a data type flowing into and out of an application which is being run, a volume of data that is flowing, and a flow rate of data inflow and data outflow, amongst other examples. Examples of computational characteristics include a CPU profile, e.g., an application execution time, and a latency of transactions, amongst other examples. Examples of memory characteristics include a usage of memory resources, such as a relatively low usage of memory, a peak usage of memory, and a relatively average usage of memory, amongst other examples. Examples of security characteristics include an interception, a filtering, and a response type, amongst other examples. Examples of traffic characteristics include a type of request for data, and a response type to the request, amongst other examples.

In embodiments, in response to profiling the running workload and determining the characteristics of the running workload, the container orchestrator tuning module 430 determines a persona of the running workload. In embodiments, the container orchestrator tuning module 430 determines the persona of the workload by either user input or by using analytics. In further embodiments, the persona represents a type of workload.

In embodiments, to determine the persona of the running workload by user input, the container orchestrator tuning module 430 displays the characteristics to a user. In embodiments, a user is a software professional. For example, the user is a software developer, a software engineer, a software architect, a programmer, or other software professional, amongst other examples.

In embodiments, the container orchestrator tuning module 430 displays the characteristics to the user on a display 470 of the computing device 450. In view of the user's software knowledge, the user recognizes that the characteristics on the display 470 correspond to a specific workload type, i.e., a persona of the running workload. As an example, the user recognizes that the characteristics indicate a relatively lower volume of data and a relatively lower memory usage. As a more specific example, the user recognizes that these characteristics indicate a tabular input of data and a tabular output of data, e.g., incoming data comes in as a specific number of rows of data, and outgoing data comes out as the same number of rows of data. Further, the user recognizes that these characteristics indicate a relatively lower CPU profile and a relatively lower memory profile. In view of this recognition and the user's software knowledge, the user understands that these characteristics indicate an edge workload is running. Accordingly, the user provides identifying input into the computing device 450 that this running workload is an edge persona since the characteristics of the running workload indicate an edge workload. As a further example for an edge workload, the characteristics indicate a relatively lower input of data and a relatively lower output of data, along with a relatively lower CPU profile and a relatively lower memory profile. In this example, the user understands that these characteristics also indicate an edge workload. Accordingly, the user provides identifying input into the computing device 450 that this running workload is an edge persona.

In embodiments, for a database workload, the characteristics indicate a tabular input of data and a tabular output of data, along with characteristics that indicate query strings, and an output volume of data proportionate to a query type, amongst other characteristics. In this example, the user understands that these characteristics indicate a database workload. Accordingly, the user provides identifying input into the computing device 450 that this running workload is a database persona. As an example, for a streaming workload, the characteristics indicate a relatively lower input of types of data which have the same patterns of information, i.e., homogenous data, and a relatively high, continuous, output of homogenous data, along with a fluctuating memory profile. In this example, the user understands that these characteristics indicate a streaming workload. Accordingly, the user provides identifying input into the computing device 450 that this running workload is a streaming persona since the characteristics indicate a streaming workload.

In embodiments, for an analytic workload, the characteristics indicate a relatively high input of data having different types of patterns, i.e., heterogenous data, and a relatively low output of heterogenous data, along with relatively long latency plus high CPU and memory profile. In this example, the user understands that these characteristics indicate an analytic workload. Accordingly, the user provides identifying input into the computing device 450 that this running workload is an analytic persona.

In embodiments, for a proxy behavior for a financial workload, the characteristics indicate a relatively low memory and a relatively lower CPU profile, along with proportionate outbound and inbound connections, indicating a specific type of proxy behavior. Further, the characteristics indicate a proxy behavior with a relatively low, continuous input of data and a relatively low continuous output of data, along with relatively moderate to relatively high security characteristics. In this example, the user understands that these characteristics indicate a financial workload. Accordingly, the user provides identifying input into the computing device 450 that this running workload is a financial persona since the characteristics indicate a financial workload. Alternatively, the characteristics indicate a proxy behavior with a relatively high set of security characteristics. In this example, the user understands that these characteristics indicate a federal workload. Accordingly, the user provides identifying input into the computing device 450 that this running workload is a federal persona.

In embodiments, the user sends the identity of the persona of the running workload to the container orchestrator tuning module 430 through the network 410 using the input device 460 of the computing device 450. In embodiments, the container orchestrator tuning module 430 identifies the persona by receiving the identity of the persona from the user.

In embodiments, the container orchestrator tuning module 430 alternatively identifies the persona of the running workload by using analytics. In embodiments, the container orchestrator tuning module 430 uses machine learning to learn which characteristics correspond to which personas. Specifically, as the container orchestrator tuning module 430 receives the identities of the personas from the user, the container orchestrator tuning module 430 compiles the identity data as training data. In embodiments, the training data includes which characteristics correspond to which personas. As an example, the training data includes an identity of a streaming persona and includes the characteristics which correspond to the streaming persona. For example, the characteristics include a relatively lower input of homogenous data, a relatively high, continuous, output of homogenous data, and a fluctuating memory profile, all which correspond to a streaming persona. In this example, the container orchestrator tuning module 430 learns that the streaming workload has these characteristics. As the training data compiles over time, a knowledge corpus of which characteristics belong to which personas develops. In embodiments, the knowledge corpus resides within the database 440 and is accessible by the container orchestrator tuning module 430 through the network 410.

In embodiments, the container orchestrator tuning module 430 identifies the persona of the running workload through analytics in view of the knowledge corpus. In embodiments, the container orchestrator tuning module 430 profiles a running workload to determine characteristics of the running workload. In response to determining the characteristics, the container orchestrator tuning module 430 analyzes the characteristics in view of the knowledge corpus. Specifically, the knowledge corpus includes sets of characteristics which match to personas. In embodiments, the container orchestrator tuning module 430 the compares the characteristics of the running workload to the sets of characteristics within the knowledge corpus. In view of finding a match between the characteristics of the running workload and a set of characteristics within the knowledge corpus, the container orchestrator tuning module 430 determines the identity of the persona in view of the persona which matches to the set of characteristics. In this way, the container orchestrator tuning module 430 determines a persona of a running workload through analytics and various heuristics.

FIG. 5 illustrates a policy matrix 500, which maps personas 510, 510*a*, 510*b*, 510*c*, 510*d* to orchestration policies CP1-CP4, IP1-IP4, MP1-MP4, SP1-SP3 in view of indicators 520, 520*b*, 520*c*, in accordance with aspects of the invention. In embodiments, the container orchestrator tuning module 430 of FIG. 4 maps the personas 510, 510*a*, 510*b*, 510*c*, 510*d* to orchestration policies CP1-CP4, IP1-IP4, MP1-MP4, SP1-SP3 in response to the user selecting the orchestration policies CP1-CP4, IP1-IP4, MP1-MP4, SP1-SP3 for the container orchestrator module 432 to have a relatively optimal performance and is described with reference to elements depicted in FIG. 4.

In embodiments, in response to determining the persona, the user selects at least one orchestration policy of the orchestration policies CP1-CP4, IP1-IP4, MP1-MP4, SP1-SP3 for application to the container orchestrator module 432 so that the container orchestrator module 432 performs at a relatively optimal level for the running workload. In embodiments, the orchestration policies CP1-CP4, IP1-IP4, MP1-MP4, SP1-SP3 include CPU scheduling policies (CP1, CP2, CP3, CP4), memory policies (MP1, MP2, MP3, MP4), container image policies (IP1, IP2, IP3, IP4), security policies (SP1, SP2, SP3, SP4), and networking policies (NP1, NP2, NP3, NP4). In further embodiments, each orchestration policy of the orchestration policies CP1-CP4, NP1-NP4, IP1-IP4, MP1-MP4, SP1-SP3 includes values for one or more tunable parameters within the container orchestrator module 432. As an example, orchestration policies CP1-CP4 include values for parameters which represent a number of CPUs per container that the container orchestrator module 432 should allocate. In this example, the orchestration policies CP1-CP4 include values for a number of CPUs for the container orchestrator module 432 to allocate. As a further example, the user selects the orchestration policy CP3, which represents a value of 16 CPUs, in view of the persona being a streaming persona. As another example, the user selects the orchestration policy CP1, which represents a value of 12 CPUs, in view of an edge persona. In this example, the user understands that a streaming workload requires a greater number of CPUs than an edge workload and selects at least one of the orchestration policies CP1-CP4, NP1-NP4, IP1-IP4, MP1-MP4, SP1-SP3 in view of the workloads.

In embodiments, the user selects orchestration policies CP1-CP4, NP1-NP4, IP1-IP4, MP1-MP4, SP1-SP3 in view various indicators 520, 520a, 520b. As shown in FIG. 5, indicator 520 is a performance indicator, indicator 520a is a reliability indicator, and indicator 520b is a security indicator. As an example, the user selects the orchestration policy MP1, which includes a parameter for an amount of memory, e.g., two gigabits, for an analytic persona. In view of the user's software knowledge, the user understands that for an analytic workload, which the analytic persona represents, a larger amount of memory increases the reliability of the analytic workload. As another example for an analytic persona, the user selects the orchestration policy CP2, which includes a parameter for a number of CPUs, e.g., 14 CPUs. In view of the user's software knowledge, the user understands that for an analytic workload, a larger number of CPUs increases the performance.

In embodiments, the container orchestrator tuning module 430 uses machine learning to learn which of the orchestration policies CP1-CP4, NP1-NP4, IP1-IP4, MP1-MP4, SP1-SP3 provide a relatively optimal performance for the container orchestrator module 432. Specifically, as the user selects the orchestration policies CP1-CP4, NP1-NP4, IP1-IP4, MP1-MP4, SP1-SP3 for the personas 510, 510a, 510b, 510c, 510d, the container orchestrator tuning module 430 generates the policy matrix 500. In embodiments, the container orchestrator tuning module 430 generates the policy matrix 500 by mapping the selections of orchestration policies CP1-CP4, NP1-NP4, IP1-IP4, MP1-MP4, SP1-SP3 to the personas 510, 510a, 510b, 510c, 510d by the user in view of the indicators 520, 520a, 520b. In this way, the container orchestrator tuning module 430 learns which orchestration policies CP1-CP4, NP1-NP4, IP1-IP4, MP1-MP4, SP1-SP3 to select by generating the policy matrix 500, which maps the orchestration policies CP1-CP4, NP1-NP4, IP1-IP4, MP1-MP4, SP1-SP3 to the personas 510, 510a, 510b, 510c, 510d. Accordingly, the container orchestrator tuning module 430 learns which orchestration policies CP1-CP4, NP1-NP4, IP1-IP4, MP1-MP4, SP1-SP3 to apply to the container orchestrator module 432 by using the policy matrix 500. In embodiments, the policy matrix 500 resides within the knowledge corpus, which resides within the database 440, and is accessible by the container orchestrator tuning module 430 through the network 410.

In embodiments, the container orchestrator tuning module 430 uses the policy matrix 500 to identify and apply at least one orchestration policy of the orchestration policies CP1-CP4, NP1-NP4, IP1-IP4, MP1-MP4, SP1-SP3 for a running workload. As an example, the container orchestrator tuning module 430 receives an identity of a persona for a running workload from a user, or the container orchestrator tuning module 430 identifies the persona of the running workload in view of the knowledge corpus. In response to receiving the identity of the persona from the user or in response to identifying the persona, the container orchestrator tuning module 430 consults the policy matrix 500 to identify at least one orchestration policy of the orchestration policies CP1-CP4, NP1-NP4, IP1-IP4, MP1-MP4, SP1-SP3 which maps to that persona. For example, the container orchestrator tuning module 430 identifies a persona as a streaming persona for a running workload. In response to identifying the streaming persona, the container orchestrator tuning module 430 consults the policy matrix 500 and identifies that the orchestration policies CP3, NP1, IP2, MP2, SP1 map to the streaming persona. As a more specific example, orchestration policy CP3 represents parameters "[—cpus 16, —cpu-shares=0.7]," and orchestration policy NP1 represents parameters "[sysctl-p sys.net.ipv4.tcp.nagile=0, echo 1024*1024>/proc/sys/net/core/wmem_max]." Additionally, orchestration policy IP2 represents parameters "[—disable-content-trust=true, —pull=missing]," orchestration policy MP2 represents parameters "[—memory 1 g, —memory-swap 512m]," and orchestration policy SP1 represents parameters "[—security-opt="seccomp=unconfined"]."

In embodiments, in response to identifying which of the orchestration policies CP1-CP4, NP1-NP4, IP1-IP4, MP1-MP4, SP1-SP3 map to the persona by consulting the policy matrix 500, the container orchestrator tuning module 430 tunes the container orchestrator module 432 in view of the parameters within the orchestration policies CP1-CP4, NP1-NP4, IP1-IP4, MP1-MP4, SP1-SP3. In embodiments, each orchestration policy of the orchestration policies CP1-CP4, NP1-NP4, IP1-IP4, MP1-MP4, SP1-SP3 represents values for one or more tunable parameters within the container orchestrator module 432. In embodiments, the container orchestrator tuning module 430 tunes the container orchestrator module 432 of the container orchestrator server 420 by changing the parameters of the container orchestrator module 432 to match at least one orchestration policy of the orchestration policies CP1-CP4, NP1-NP4, IP1-IP4, MP1-MP4, SP1-SP3 which maps to that persona. As an example, for a streaming persona, the container orchestrator tuning module 430 tunes the parameters of "—cpus 14, —cpu-shares=0.6" to "—cpus 16, —cpu-shares=0.7" of the container orchestrator module 432 to match the orchestration policy CP3, since orchestration policy CP3 maps to the streaming persona in the policy matrix 500. In this way, the container orchestrator tuning module 430 tunes the parameters of the container orchestrator module 432 so that the container orchestrator module 432 matches at least one orchestration policy of the orchestration policies CP1-CP4, NP1-NP4, IP1-IP4, MP1-MP4, SP1-SP3.

In embodiments, in response to tuning all the parameters, the container orchestrator tuning module 430 restarts the container orchestrator module 432, which restarts the deployment of containers by the container orchestrator module 432. In embodiments, the deployment of containers occurs by the container orchestrator module 432 deploying containers from a registry of the containers to the running workload. In embodiments, the deployment of containers is relatively faster now because of the tuning of the container orchestrator module 432. Additionally, the tuning of the container orchestrator module 432 allows for a relatively larging scaling of containers to be available for deployment for the running workload. By deploying containers relatively faster and/or scaling more containers for deployment, the performance of the running workload improves because of an increase of computing resources available to the running workload to utilize.

In embodiments, the container orchestrator tuning module 430 goes into to a waiting state for a new workload. In response to determining a new workload is running by determining the container orchestrator module 432 is performing actions, e.g., deploying containers to run the new workload, the container orchestrator tuning module 430 begins the process again.

Figure 6:
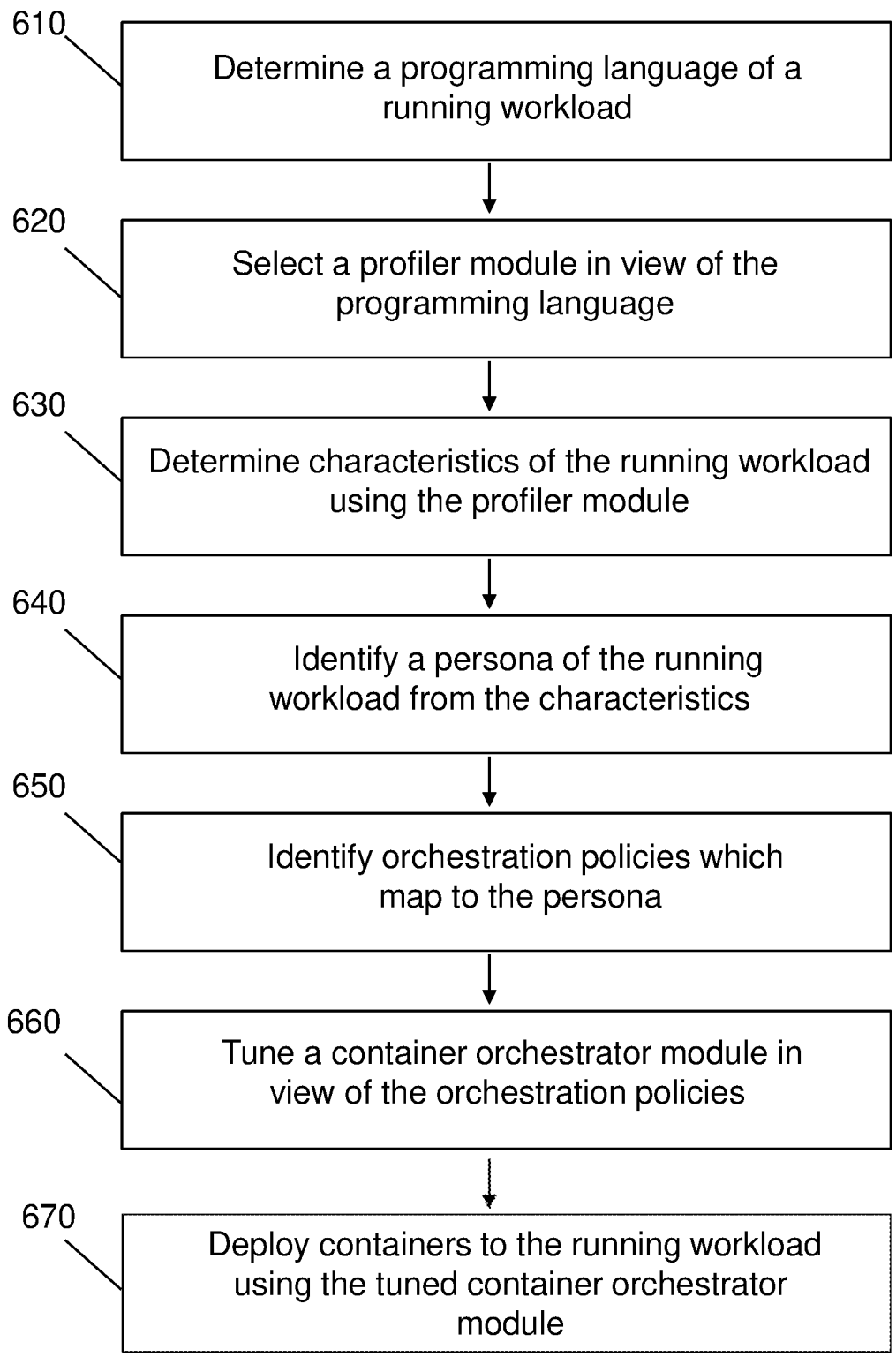
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIGS. 4 and 5.

At step 610, the container orchestrator tuning module 430 determines a programming language of a running workload. In embodiments, and as described with respect to FIGS. 4 and 5, the container orchestrator tuning module 430 determines the programming language of the running workload in view of actions by the container orchestrator module 432. As an example, the container orchestrator tuning module 430 determines the programming language is java in response to the container orchestrator module 432 deploying a plurality of containers which host microservices running a java language.

At step 620, the container orchestrator tuning module 430 selects a profiler module in view of the programming language. In embodiments, and as described with respect to FIGS. 4 and 5, the container orchestrator tuning module 430 selects a profiler module of the profiler modules 434 which matches a specific programming language. In embodiments, the container orchestrator tuning module 430 selects a profiler module from these profiler modules 434 based on the programming language. As an example, in response to the container orchestrator tuning module 430 determining a workload using a java programming language, the container orchestrator tuning module 430 selects the profiler module specific to the java programming language.

At step 630, the container orchestrator tuning module 430 determines characteristics of the running workload using the profiler module to determine characteristics of the running workload. In embodiments, and as described with respect to FIGS. 4 and 5, the container orchestrator tuning module 430 profiles the running workload by recording various characteristics of the running workload using the profiler module.

At step 640, the container orchestrator tuning module 430 identifies a persona of the running workload from the characteristics. In embodiments, and as described with respect to FIGS. 4 and 5, the container orchestrator tuning module 430 determines the persona either by user input or by using analytics. In embodiments, for determining the persona by user input, the container orchestrator tuning module 430 receives an identity of the running workload from the user and determines the persona as being this identity. In embodiments, for determining the persona by using analytics, the container orchestrator tuning module 430 analyzes the characteristics in view of the knowledge corpus to determine an identity of the running workload. The container orchestrator tuning module 430 determines the persona as being this identity.

At step 650, the container orchestrator tuning module 430 identifies orchestration policies CP1-CP4, NP1-NP4, IP1-IP4, MP1-MP4, SP1-SP3 which map to the persona. In embodiments, and as described with respect to FIGS. 4 and 5, the container orchestrator tuning module 430 identifies the orchestration policies CP1-CP4, NP1-NP4, IP1-IP4, MP1-MP4, SP1-SP3 which map to the persona of the personas 510, 510a, 510b, 510c, 510d by consulting the policy matrix 500.

At step 660, the container orchestrator tuning module 430 tunes a container orchestrator module 432 in view of the orchestration policies CP1-CP4, NP1-NP4, IP1-IP4, MP1-MP4, SP1-SP3. In embodiments, and as described with respect to FIGS. 4 and 5, the container orchestrator tuning module 430 tunes the container orchestrator module 432 by changing parameters of the container orchestrator module 432 to match parameters within the orchestration policies CP1-CP4, NP1-NP4, IP1-IP4, MP1-MP4, SP1-SP3.

At step 670, the container orchestrator tuning module 430 deploys containers to the running workload using the tuned container orchestrator module 432. In embodiments, and as described with respect to FIGS. 4 and 5, the tuned container orchestrator module 432 deploys the containers from a registry of containers to the running workload.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, by a computing device, a programming language of a running workload;
   selecting, by the computing device, a profiler module in view of the programming language;
   determining, by the computing device, characteristics of the running workload using the profiler module;
   identifying, by the computing device, a persona of the running workload from the determined characteristics by utilizing machine learning to train identity data of the persona and learn the persona which corresponds with the determined characteristics;
   identifying, by the computing device, orchestration policies which map to the persona by utilizing machine learning to learn which of the orchestration policies map to the persona;
   tuning, by the computing device, a container orchestrator module in view of the orchestration policies; and
   deploying, by the computing device, containers to the running workload using the tuned container orchestrator module, wherein the determined characteristics include a lower input of homogenous data, a high output of homogenous data, and a fluctuating memory profile of a streaming workload.

2. The method of claim 1, wherein the characteristics are selected from the group consisting of network characteristics, computational characteristics, memory characteristics, security characteristics, and traffic characteristics.

3. The method of claim 1, wherein the persona is selected from the group consisting of an edge persona, an analytic persona, a streaming persona, a finance persona, or a federal persona.

4. The method of claim 1, wherein the identifying the persona includes receiving an identity of the persona from a user.

5. The method of claim 1, wherein the identifying the persona includes determining an identity of the persona using analytics.

6. The method of claim 5, wherein the using the analytics includes comparing the characteristics to a set of characteristics within a knowledge corpus.

7. The method of claim 1, wherein the container orchestrator module includes one or more parameters.

8. The method of claim 7, wherein the orchestration policies include values for the one or more parameters of the container orchestrator module.

9. The method of claim 8, wherein the tuning the container orchestrator module includes changing parameters of the container orchestrator module to match the values of the orchestration policies.

10. The method of claim 1, wherein the identifying the orchestration policies includes consulting a policy matrix which maps the orchestration policies to the persona.

11. The method of claim 1, wherein the orchestration policies include values for an amount of CPUs for the container orchestrator module to allocate.

12. The method of claim 1, wherein the computing device includes software provided as a service in a cloud environment.

13. A computer program product comprising one or more computer readable storage media having program instructions collectively stored on the one or more computer readable storage media, the program instructions executable to:
determine a workload is running;
determine a programming language of the workload;
select a profiler module in view of the programming language;
determine characteristics of the workload using the profiler module;
identify a persona of the workload from the determined characteristics by utilizing machine learning to train identity data of the persona and learn the persona which corresponds with the determined characteristics;
identify orchestration policies which map to the persona by utilizing machine learning to learn which of the orchestration policies map to the persona; and
tune a container orchestrator module in view of the orchestration policies,
wherein the determined characteristics include a lower input of homogenous data, a high output of homogenous data, and a fluctuating memory profile of a streaming workload.

14. The computer program product of claim 13, wherein the determining the workload is running includes determining the container orchestrator module is performing actions.

15. The computer program product of claim 13, wherein the actions include the container orchestrator module deploying containers to run the workload.

16. The computer program product of claim 13, wherein the identifying the persona includes determining an identity of the persona by analytics.

17. A system comprising:
a processor, a computer readable memory, one or more computer readable storage media, and program instructions collectively stored on the one or more computer readable storage media, the program instructions executable to:
determine a container orchestrator module is performing actions to run a workload;
determine a programming language of the workload;
select a profiler module in view of the programming language;
determine characteristics of the workload using the profiler module;
identify a persona of the workload from the determined characteristics by utilizing machine learning to train identity data of the persona and learn the persona which corresponds with the determined characteristics;
identify orchestration policies which map to the persona by utilizing machine learning to learn which of the orchestration policies map to the persona;
tune the container orchestrator module in view of the orchestration policies; and
deploy containers to the workload using the tuned container orchestrator module,
wherein the determined characteristics include a lower input of homogenous data, a high output of homogenous data, and a fluctuating memory profile of a streaming workload.

18. The system of claim 17, wherein the program instructions are executable to tune the container orchestrator module by changing parameters of the container orchestrator module in view of the orchestration policies.

19. The system of claim 17, wherein the identifying the persona includes determining an identity of the persona by using analytics.

20. The system of claim 19, wherein the identifying the orchestration policies includes consulting a policy matrix which maps the orchestration policies to the persona.

* * * * *